United States Patent
Cifers et al.

(10) Patent No.: US 12,352,302 B1
(45) Date of Patent: Jul. 8, 2025

(54) ROTATION LOCKING DEVICE FOR T-BOLT

(71) Applicant: YakAttack, LLC, Farmville, VA (US)

(72) Inventors: Luther Cifers, Farmville, VA (US); Daniel Anderson Newman, Salem, VA (US)

(73) Assignee: YakAttack LLC, Farmville, VA (US)

( * ) Notice: Subject to any disclaimer, the term of this patent is extended or adjusted under 35 U.S.C. 154(b) by 24 days.

(21) Appl. No.: 18/344,813

(22) Filed: Jun. 29, 2023

Related U.S. Application Data

(63) Continuation of application No. 16/993,230, filed on Aug. 13, 2020, now Pat. No. 11,725,686.

(60) Provisional application No. 62/886,022, filed on Aug. 13, 2019.

(51) Int. Cl.
*F16B 37/04* (2006.01)
*F16B 21/02* (2006.01)

(52) U.S. Cl.
CPC ............ *F16B 37/045* (2013.01); *F16B 21/02* (2013.01)

(58) Field of Classification Search
CPC ............................... F16B 37/045; F16B 21/02
See application file for complete search history.

(56) References Cited

U.S. PATENT DOCUMENTS

| | | |
|---|---|---|
| 2,928,512 A | 3/1960 | Slater et al. |
| 3,053,355 A | 9/1962 | Attwood |
| 4,575,295 A | 3/1986 | Rebentisch |
| 4,878,640 A | 11/1989 | Fricker et al. |
| 5,199,836 A | 4/1993 | Gogarty |
| 5,655,865 A | 8/1997 | Plank et al. |
| 5,820,322 A | 10/1998 | Hermann et al. |
| 6,086,300 A | 7/2000 | Frohlich |
| 6,290,426 B1 | 9/2001 | Gijsel et al. |
| 6,641,097 B1 | 11/2003 | Halpaus et al. |

(Continued)

OTHER PUBLICATIONS

USPTO, Advisory Action dated Mar. 3, 2023, in U.S. Appl. No. 16/993,230, filed Aug. 13, 2020 (Parent Application).

(Continued)

*Primary Examiner* — Gisele D Ford
(74) *Attorney, Agent, or Firm* — Thedford I. Hitaffer; Hitaffer & Hitaffer, PLLC

(57) ABSTRACT

A T-bolt locking device provides positive engagement of a T-bolt with a track as well as prevents disengagement from the track when loosening the T-bolt sufficiently to allow movement of an accessory along a slot in the track to a new position. Tightening the accessory onto the T-bolt secures flanges of the head of the T-bolt against an inner surface of the track while fixing the accessory to the track. The T-bolt locking device comprises opposing tabs configured to pass through the slot in the track and receive the flanges of the head of the T-bolt, whereby the locking device is in the engaged position, preventing rotation of the head of the T-bolt in relation to the tabs. When fastening the T-bolt and locking device, if the locking device does not seat against the track surface, this indicates that the T-bolt is under-rotated and not properly engaged with the track because the opposing tabs of the locking device are contacting the upper face of the T-bolt flange. This prevents the opposing flanges of the head of the T-bolt from being received between the terminal inner surfaces of the tabs of the locking device, and thus, prevents the accessory from being tightened against the track.

11 Claims, 15 Drawing Sheets

(56) References Cited

U.S. PATENT DOCUMENTS

| | | | |
|---|---|---|---|
| 9,347,213 | B1 | 5/2016 | Zhang et al. |
| 2003/0201374 | A1 | 10/2003 | Faucher et al. |
| 2004/0228681 | A1 | 11/2004 | Herb |
| 2005/0036848 | A1 | 2/2005 | Cunningham et al. |
| 2006/0027713 | A1 | 2/2006 | Walraven |
| 2006/0257225 | A1 | 11/2006 | Klinkman et al. |
| 2009/0080999 | A1 | 3/2009 | Dunn |
| 2010/0102011 | A1 | 4/2010 | Blum |
| 2010/0202851 | A1 | 8/2010 | Rass et al. |
| 2011/0039430 | A1 | 2/2011 | Aftanas |
| 2011/0121153 | A1 | 5/2011 | Magno, Jr. et al. |
| 2012/0192399 | A1 | 8/2012 | Dinh |
| 2014/0260083 | A1 | 9/2014 | Zhang et al. |
| 2015/0023759 | A1 | 1/2015 | Klopfenstein |
| 2015/0052712 | A1 | 2/2015 | Markiewicz et al. |
| 2015/0176631 | A1 | 6/2015 | McCarthy et al. |
| 2015/0369269 | A1 | 12/2015 | Holt et al. |
| 2016/0138261 | A1 | 5/2016 | Zhang et al. |
| 2016/0363153 | A1 | 12/2016 | Lakoduk et al. |
| 2018/0266476 | A1 | 9/2018 | Linka et al. |
| 2020/0039033 | A1 | 2/2020 | Lai et al. |

OTHER PUBLICATIONS

USPTO, Office Action dated Mar. 7, 2022, in U.S. Appl. No. 16/993,230, filed Aug. 13, 2020 (Parent Application).

USPTO, Office Action dated Oct. 12, 2022, in U.S. Appl. No. 16/993,230, filed Aug. 13, 2020 (Parent Application).

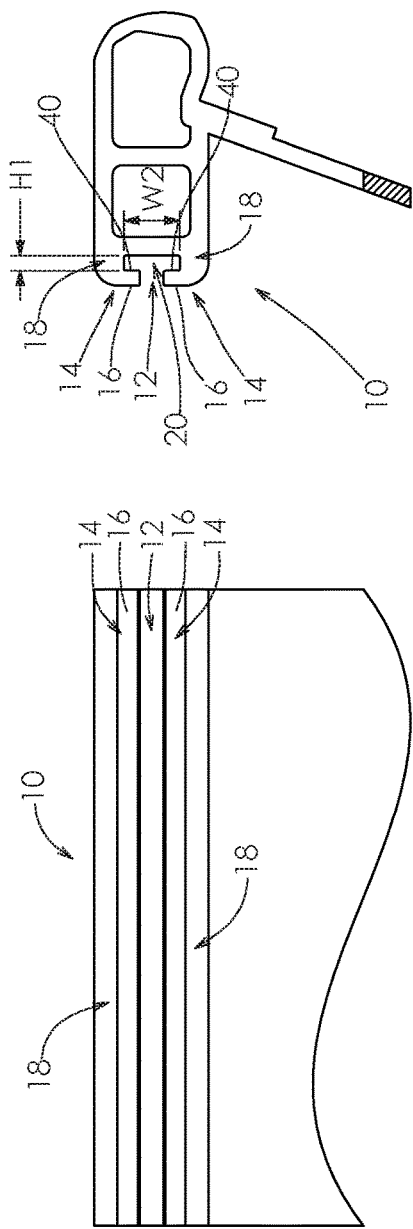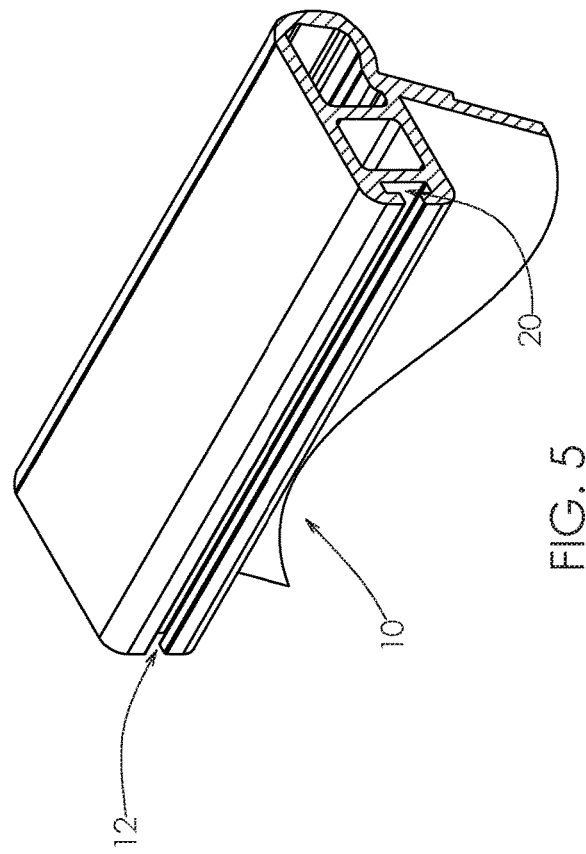

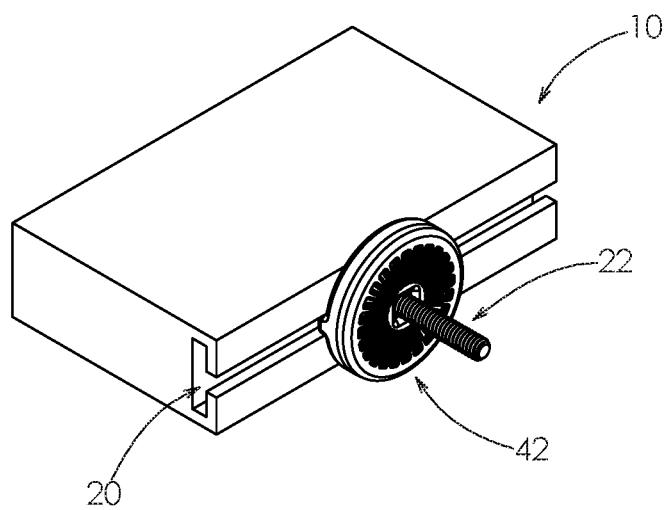
FIG. 25
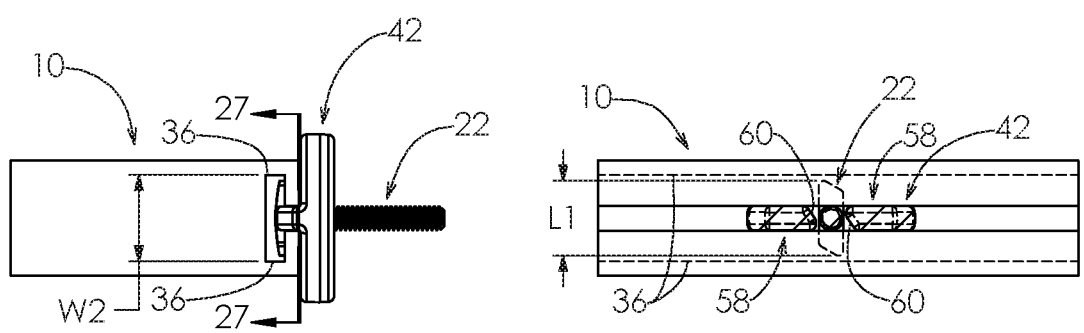
FIG. 26
FIG. 27

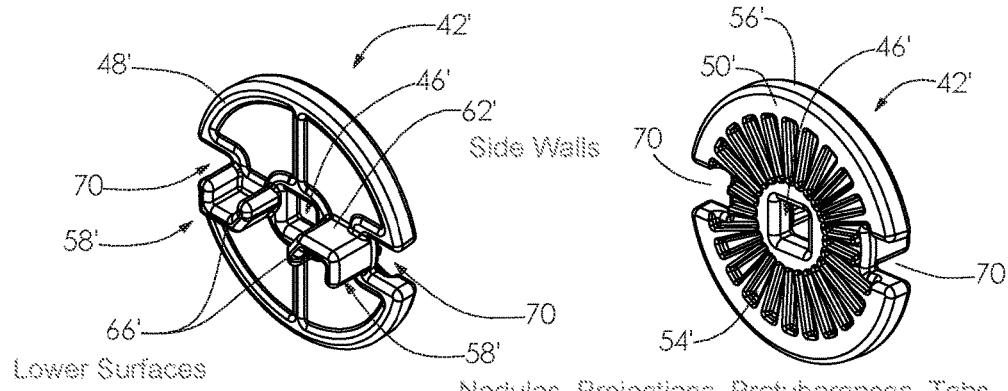
FIG. 36
FIG. 41
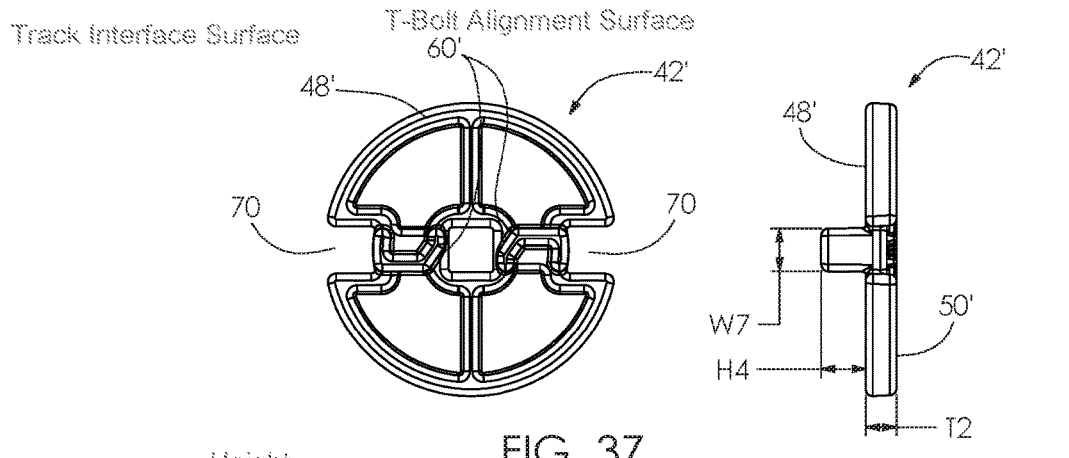
FIG. 37
FIG. 38
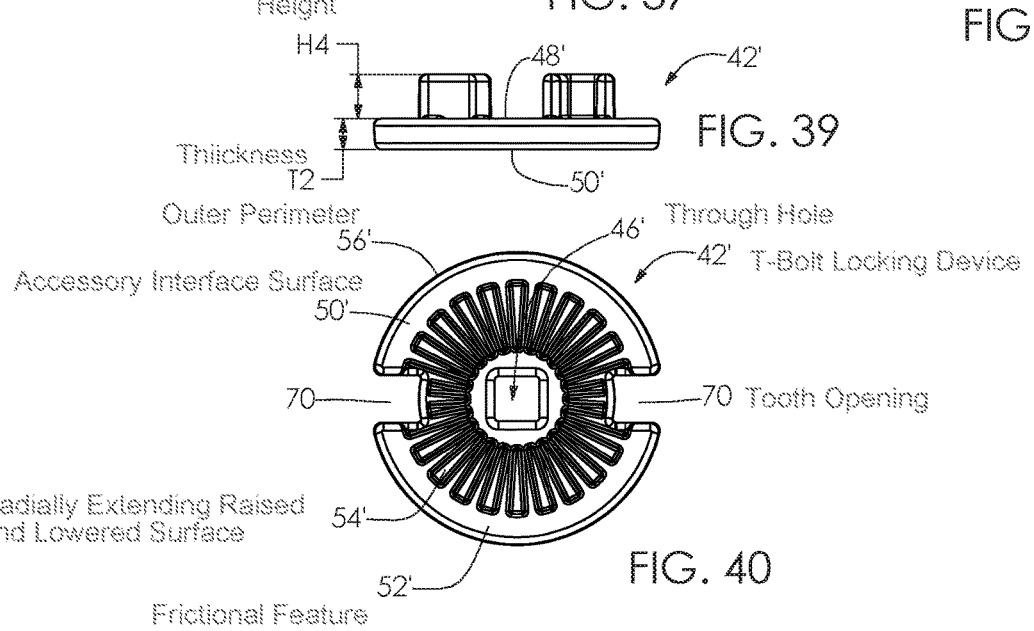
FIG. 39
FIG. 40

ROTATION LOCKING DEVICE FOR T-BOLT

CROSS-REFERENCE TO RELATED APPLICATIONS

This application is a continuation of U.S. patent application Ser. No. 16/993,230 filed on Aug. 13, 2020, which claims priority to U.S. Provisional Application No. 62/886,022, filed Aug. 13, 2019, the disclosures of which are incorporated herein by reference in their entirety.

BACKGROUND OF THE INVENTION

This invention relates in general to accessory mounting tracks for mounting accessories in relation to environmental surfaces, and more particularly, to rotation locking devices for T-bolts for use with accessory mounting tracks.

Accessory mounting tracks typically comprises an elongated slot at least partially defined by opposing walls, which defined a mounting surface for mounting an accessory. The opposing walls are supported in a cantilevered manner by side walls. An interior is bounded at least in part by inner surfaces of the opposing walls and side walls. Accessories are mounted to the track by use of T-bolts. T-bolts may be dimensioned and configured for insertion into the interior of the track through the slot. Such T-Bolts have a head that has a width that is narrower than the slot width and a length that is equal to or greater than the track interior width. T-bolts of this nature are placed into the track by passing the head of the T-Bolt into the track slot. The T-bolt enters the track slot with the T-bolt head aligned with the slot. Rotating the T-bolt, until a long portion of the T-bolt head contacts interior extents of the track side walls, retains the T-bolt in the track. The head prevents removal of the T-bolt when moving the T-bolt normal to the face of the track slot. The T-bolt head is longer than the interior width of the track to limit free rotation of the T-bolt in the confines of the track. That is to say, the extent of the track profile creates a stop for the T-bolt so that the T-bolt becomes rotationally fixed while a threaded accessory is tightened onto the T-bolt threads, pulling the T-bolt head toward the inner surfaces of the opposing walls of the track adjacent the slot, fixing the T-bolt and the accessory threaded to the T-bolt in place on the track. Loosening the threaded accessory from the T-bolt urges rotation of the T-bolt in a counter-clockwise direction, which can align the T-bolt head with the track slot, at which point the T-bolt can become disengaged from the slot.

When using a T-bolt and track as described above, the rotational position of the T-bolt is typically obscured from view by the accessory being mounted to the track, and the security of the connection is not clearly known. Additionally, when the accessory is loosened in an effort sufficiently to slide the T-bolt and the accessory to a new position, the T-bolt can be urged to rotate toward and into a disengaged position, where head of the T-bolt is aligned with the slot in the track, allowing the accessory and T-bolt to fall out of the track.

SUMMARY OF THE INVENTION

This invention relates to a T-bolt locking device, which provides positive engagement of a T-bolt with a track, and prevents disengagement of the T-bolt from the track when loosening the T-bolt sufficiently to allow movement of the T-bolt and an accessory or knob or other threaded device (hereinafter accessory) along the track to a new position. Tightening the accessory onto the T-bolt secures the head of the T-bolt against an inner surface of the track while attaching the accessory to the track. A preferred embodiment of the T-bolt locking device comprises opposing tabs configured to be inserted into the track slot and receive the head of the T-bolt between the tabs, whereby the locking device is in the engaged position, preventing rotation of the locking device and the T-bolt in relation to the track. Another embodiment may comprise only one such tab. When fastening the T-bolt and locking device, if the locking device does not seat against the accessory mounting surface, this indicates that the T-bolt is under-rotated and not properly engaged with the track because the opposing tabs of the locking device are contacting an upper surface of the T-bolt head. This prevents the T-bolt from being received between the tabs of the locking device and thus prevents the accessory from tightening against the track.

Various advantages of this invention will become apparent to those skilled in the art from the following detailed description of the preferred embodiment, when read in light of the accompanying drawings.

BRIEF DESCRIPTION OF THE DRAWINGS

Various features and attendant advantages of the T-bolt locking device will become more fully appreciated when considered in view of the accompanying drawings, in which like reference characters designate the same or similar parts and/or features throughout the several views, and wherein:

FIG. 3 is a side elevational view of the section of the track shown in FIG. 2, FIG. 4 is an end view of section of the track shown in FIG. 3, FIG. 5 is a perspective view of the section of the track shown in FIGS. 3 and 4, FIG. 25 is a perspective view of a diagrammatic representation of the track with the T-bolt inserted into a slot of the track, and the locking device on the T-bolt and inserted into the slot of the track, FIG. 26 is a side elevational view of the track, T-bolt and the locking device shown in FIG. 25, FIG. 27 is a cross-sectional view of the T-bolt and track taken along the line 27-27 in FIG. 26, FIG. 36 is a bottom perspective view of an alternative T-bolt locking device, FIG. 37 is a bottom plan view of the locking device shown in FIG. 36, FIG. 38 is an end elevational view of the locking device shown in FIGS. 36 and 37, FIG. 39 is a side plan view of the locking device shown in FIGS. 36-38 FIG. 40 is a top plan view of the locking device shown in FIG. 36-39, FIG. 41 is a top perspective view of the locking device shown in FIG. 36-40.

DETAILED DESCRIPTION OF THE PREFERRED EMBODIMENT

Figure 2:
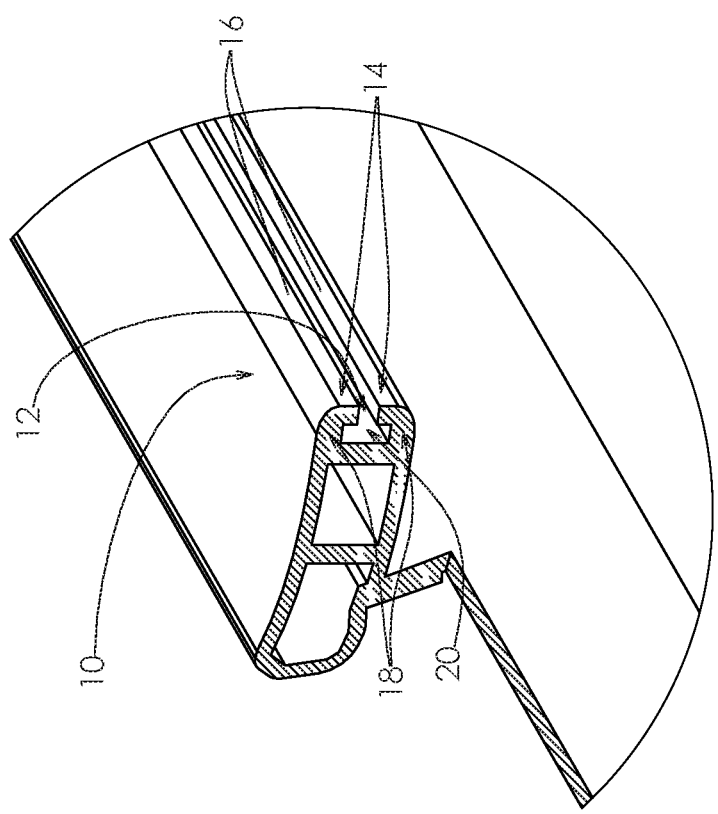
FIG. 2 is an enlarged detail view of a section of the accessory mounting track shown in FIG. 1.
Figure 1:
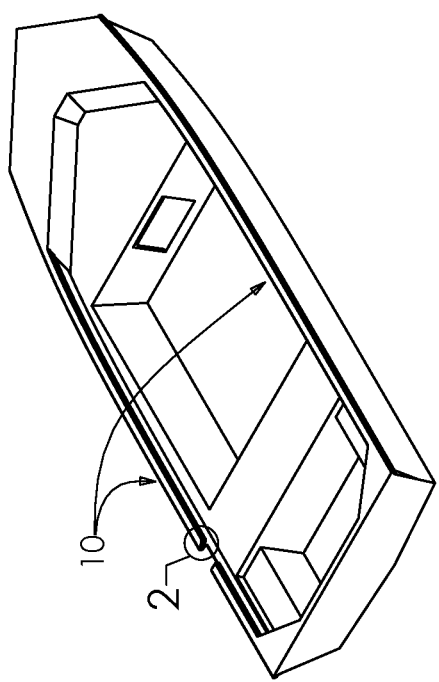
FIG. 1 is a perspective view of an exemplary marine vessel with an exemplary accessory mounting track for mounting an accessory.
Figure 6:
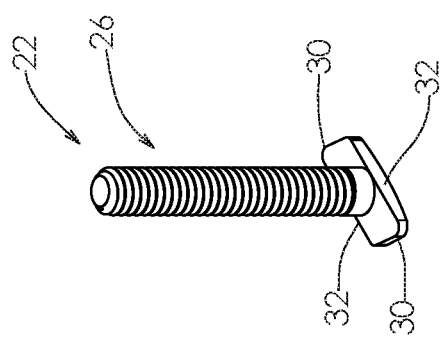
FIG. 6 is a top plan view of an exemplary T-bolt for use with the accessory mounting track.
Figure 9:
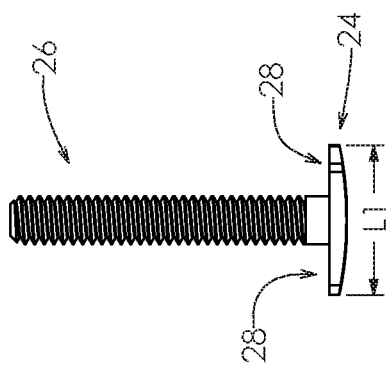
FIG. 9 is a perspective view of the T-bolt shown in FIGS. 6-8.
Figure 7:
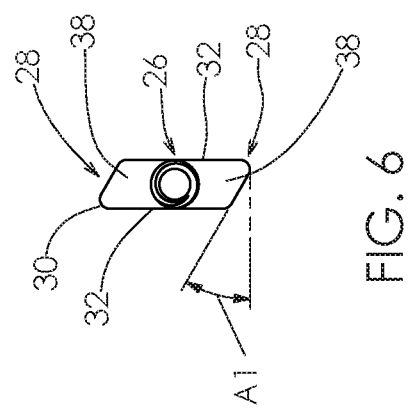
FIG. 7 is an end view of the T-bolt shown in FIG. 6.

Referring now to the drawings, there is illustrated in FIG. 1 an exemplary marine vessel with an exemplary accessory mounting track 10. As shown in FIG. 2, the track 10 may comprise a slot 12 bounded by opposing walls 14, which define a mounting surface 16 for engagement with an accessory attachable or mountable to the track 10. As shown in FIGS. 2-5, the track 10 has opposing side walls 18, from which the opposing walls 14 extend in a cantilevered manner. The track 10 has an interior 20 bounded at least partially by the opposing walls 14 and the opposing side walls 18. The interior 20 may have a general T-shape for receiving a T-bolt 22, or some other shape, geometrically configured to receive and retain the T-bolt 22. It should be understood that the track 10 can be a separate component configured to mount to an environmental surface, or recessed within an environmental surface, or be an integral part of an environmental surface, including the surface of any vehicle or vessel, such as, for example, the hull of TRACKER boats sold by BASS PRO SHOPS®.

Figure 8:
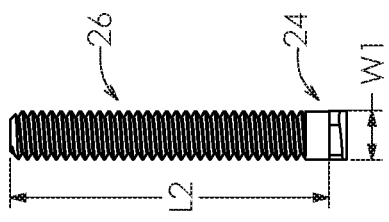
FIG. 8 is a side elevational view of the T-bolt shown in FIGS. 6 and 7.

In FIGS. 6-9, there is illustrated an exemplary T-bolt 22. The T-bolt 22 comprises a head 24 and a threaded shaft 26 (e.g., a ¼-20 threaded shaft) extending from the head 24. The head 24 comprises flanges 28 extending in opposing direction in relation to opposing sides of the shaft 26. That is to say, the head 24 is supported concentrically in relation to the shaft 26. Terminal ends 30 of each flange 28 may be angularly disposed at an angle A1 (shown in FIG. 6), or the terminal ends 30 may be perpendicular to the parallel sides 32 of the head 24. In the exemplary T-bolt 22, the bottom of the head 24 is curved, as shown in FIG. 8, like that of a carriage bolt, though the bottom may be flat or of other shapes. The head 24 is elongated in shape, having a length L1 (shown in FIG. 8) in a longitudinal direction and a width W1 (shown in FIG. 7) in a lateral direction.

Figure 11:
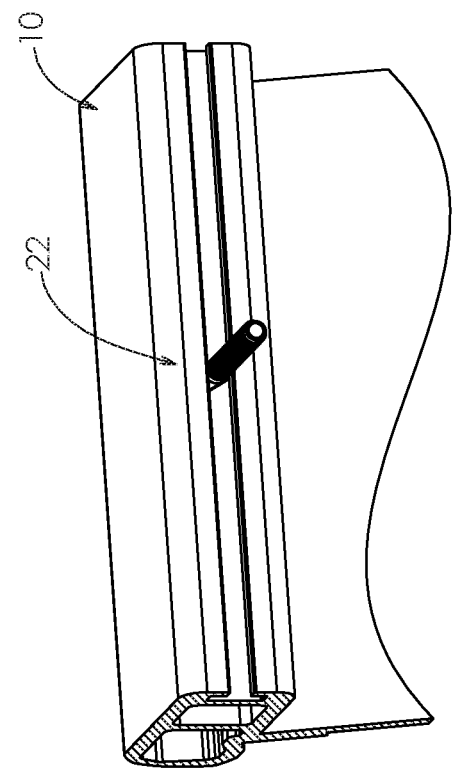
FIG. 11 is a perspective view of the section of track shown in FIG. 10 with the T-bolt rotated in the track.
Figure 10:
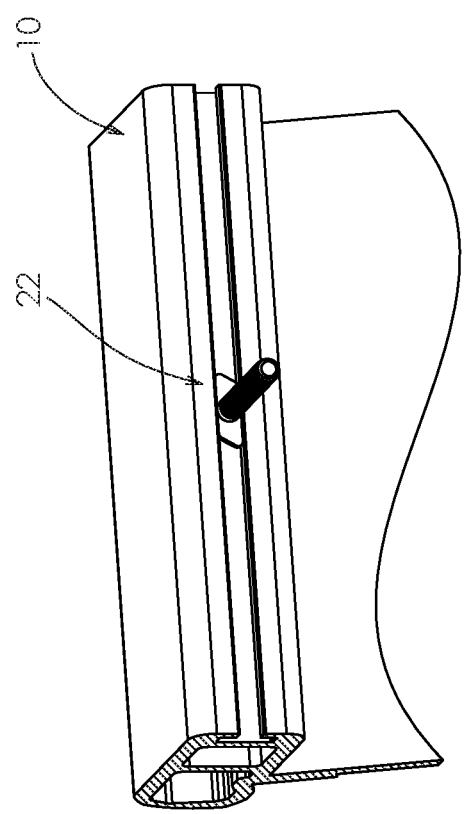
FIG. 10 is a perspective view of the section of the track shown in FIGS. 3-5 with the T-bolt inserted into a slot of the track.
Figure 12:
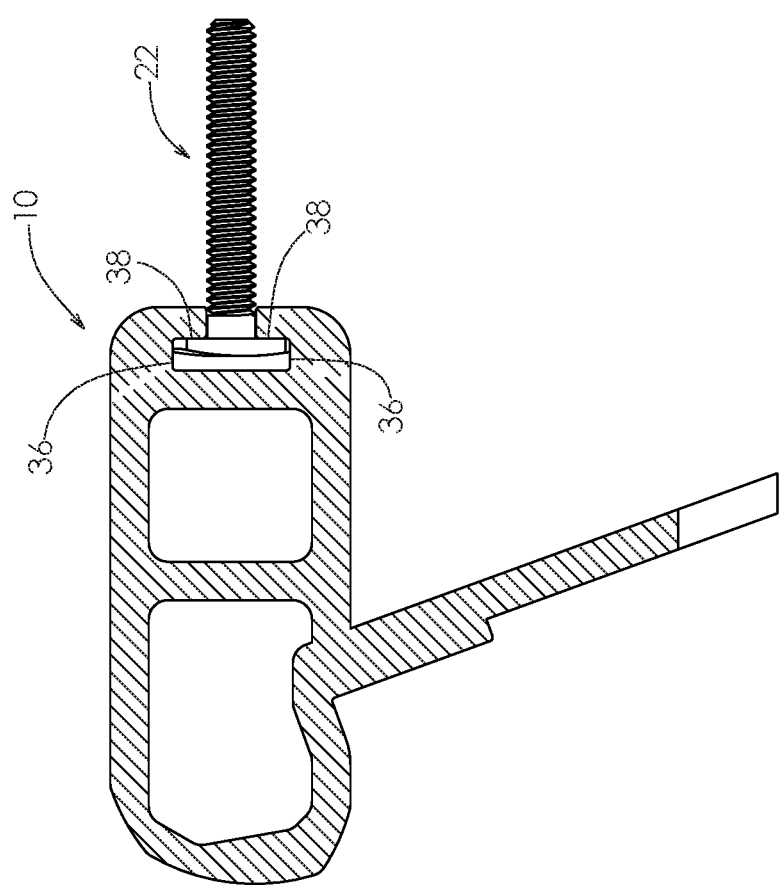
FIG. 12 is an end view of the track and the T-bolt shown in FIG. 11.

As shown in FIG. 10, the width W1 of the head 24 is sized to fit through the slot 12 when the head 24 is inserted into the slot 12 anywhere along the slot 12 in a substantially lengthwise direction that coincides with a lengthwise direction of the track 10 (i.e., in a generally horizontal direction when viewing FIG. 10). The height H1 (shown in FIG. 4) of the interior 20 of the track 10 is sufficiently dimensioned so that upon inserting the head 24 through the slot 12 and into the interior 20 of the track 10, the head 24 may be rotated beneath the opposing walls 14, for example, by rotating the shaft 26, as shown in FIG. 11, until the terminal ends 30 of the flanges 28 engage opposing inner surfaces 36 of the opposing side walls 18 of the track 10, as shown in FIG. 12. This prevents further rotation of the T-bolt 22. To be clear, the length L1 of the head 24 is preferably longer that the width W2 (shown in FIG. 4) of the interior 20 of the track 10, so that rotation of the head 24 is limited. According to a preferred embodiment of the T-bolt 22, the angular disposition of the terminal ends 30 of the flanges 28 and the cooperation with the angularly disposed terminal ends 30 of the flanges 28 with the inner surfaces 36 of the side walls 18 may restrict the rotation of the head 24 to a predetermined angle. In any event, the head 24 is rotatable to a stop position, as shown in FIG. 11. In the stop position, the head 24 is trapped in the interior 20 of the track 10, whereby removal of the head 24 is restricted by the engagement of an upper surface 38 of the flanges 28 with a lower or bottom surface 40 of the opposing walls 14 of the track 10.

It should be appreciated that, if the terminals ends 30 of the flanges 28 are at a right angle relative to the parallel sides 32 of the head 24, the leading corner of the flanged head 24 must stop rotation of the head 24 when the leading corner comes into contact with the inner surface 36 of the opposing side walls 18 of the track 10. To provide additional surface engagement, the terminal ends 30 of the flanges 28 may be angularly disposed, as mentioned above. Because of these angularly disposed terminal ends 30, the T-bolt 22 may continue to rotate until the angularly disposed terminal ends 30 of the flanges 28 are parallel and contact the inner surfaces 36 of the opposing side walls 18 of the track 10. This is not necessary but may increase surface contact between the inner surface 36 of the side walls 18 and the flanges 28 of the T-bolt 22.

Figure 20:
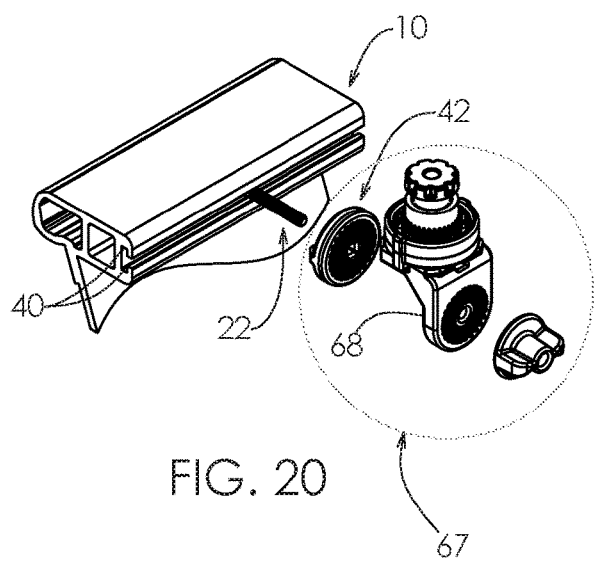
FIG. 20 is a reduced scale, exploded perspective view of the locking device and a T-bolt configured to mount an exemplary accessory and a section of track.

Rotation of the head 24, for example, in a clockwise direction when viewing FIGS. 10 and 11, can be accomplished by threading a female threaded portion of an accessory 67, which may be a thumbscrew, knob, nut, or some other threaded portion, onto the threaded shaft 26 of the T-bolt 22. The accessory 67 may be unitary in construction or may comprise two or more separate components, such as the accessory 67 shown in FIG. 20, some of which may not be threaded. The threaded portion of the accessory 67 can be threaded onto the T-bolt 22, and rotated until the cooperation between the threaded shaft 26 and the accessory 67 urges the upper surface 38 of each of the opposing flanges 28 to engage the bottom surface 40 of a respective one of the opposing walls 14 and the accessory 67 tightly engages the upper surface 16 of the opposing walls 14 to fix the accessory 67 in relation to the track 10. To adjust the position of the accessory 67 in relation to the track 10, the accessory 67 may be loosened from the threaded shaft 26 of the T-bolt 22 and slid linearly or lengthwise (i.e., generally horizontally when viewing FIGS. 10 and 11) and then retightened when in a desired position. However, it should be appreciated that upon loosening the accessory 67, the head 24 of the T-bolt 22 may rotate, for example, in a counter-clockwise direction when viewing FIGS. 10 and 11, in alignment with the slot 12, at which point the head 24 may pass through the slot 12. Because the accessory 67 may obstruct view of the head 24 of the T-bolt 22 and the slot 12, the head 24 of the T-bolt 22 could align with the slot 12 so as to inadvertently fall or otherwise come out of the slot 12, which could result in the loss of the accessory 67. Loss of the accessory 67 could particularly occur if the track 10 is supported in relation to a moving vehicle or vessel, such as a maritime vessel, for example, a kayak, moving in a body of water.

To prevent or mitigate the risk of loss of the accessory 67, an exemplary T-bolt locking device 42 is shown in FIGS. 13-16. The exemplary T-bolt locking device 42 comprises a generally disc-shaped structure (e.g., a structure with a shape or surface that is generally round and generally flat in appearance). It should be understood that the shape is not to be limited to a disc (e.g., a round structure) but may take on any suitable shape. Moreover, in this context the term flat may be understood to mean substantial planar, although other shapes may be conceivable and within the scope of the invention. The structure may have a thickness T1 (shown in FIG. 15), for example, that is relatively thin, at least in comparison to that of the length L2 (shown in FIG. 7) of the shaft 26 of the T-bolt 22 so as to leave exposed sufficient threads of the shaft 26 for readily threading into the accessory 67. Notwithstanding, the structure should be sufficiently robust (i.e., sufficiently dimensioned and configured) to provide a structural integrity ample for supporting features and engagement with the track 10 and an accessory 67, as will become apparent in the description that follows. It should be appreciated that the structure may be formed of a plastic or polymer material, or a metal material, or a combination of such materials, or such materials in combination with other materials, which would provide the desired structural integrity, within confines or limitations established, for example, by the dimensions and configuration of the track 10, the T-bolt 22 and the cooperating accessory 67.

Figure 17:
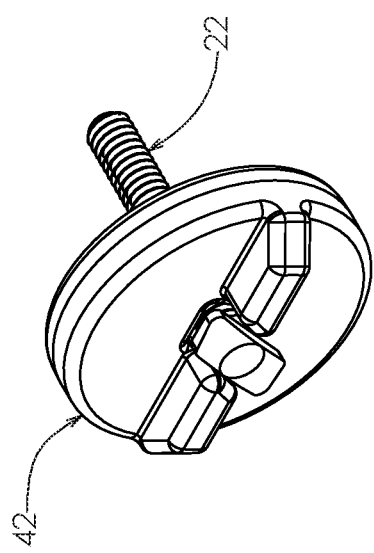
FIG. 17 is a bottom perspective view of the locking device on a T-bolt.
Figure 19:
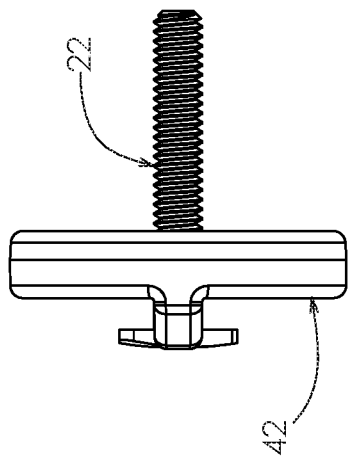
FIG. 19 is a side elevational view of the locking device and T-bolt shown in FIGS. 17 and 18.
Figure 18:
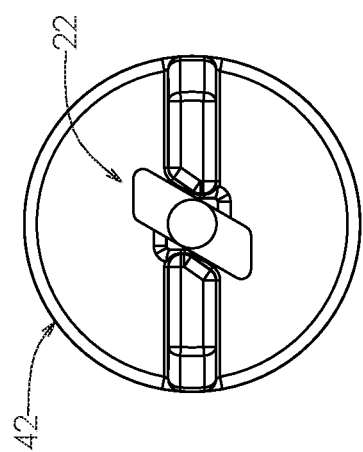
FIG. 18 is a bottom plan view of the locking device and T-bolt shown in FIG. 17.
Figure 24:
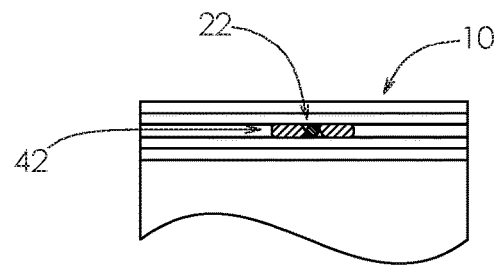
FIG. 24 is a cross-sectional view of the T-bolt and track taken along the line 24-24 in FIG. 23.

The structure comprises a through hole 46 dimensioned and configured to permit the passage of the threaded shaft 26 of the T-bolt 22 therethrough (shown in FIGS. 17-19). Although a generally square-shaped through hole 46 is shown, the through hole 46 may be of any suitable shape dimensioned to permit the passage of the threaded shaft 26.

Figure 16:
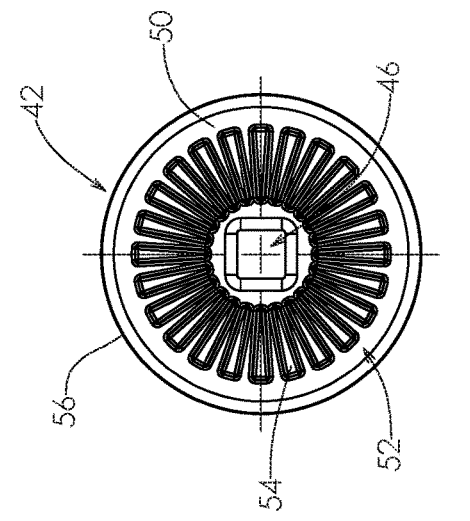
FIG. 16 is a top plan view of the locking device shown in FIGS. 13-15.
Figure 13:
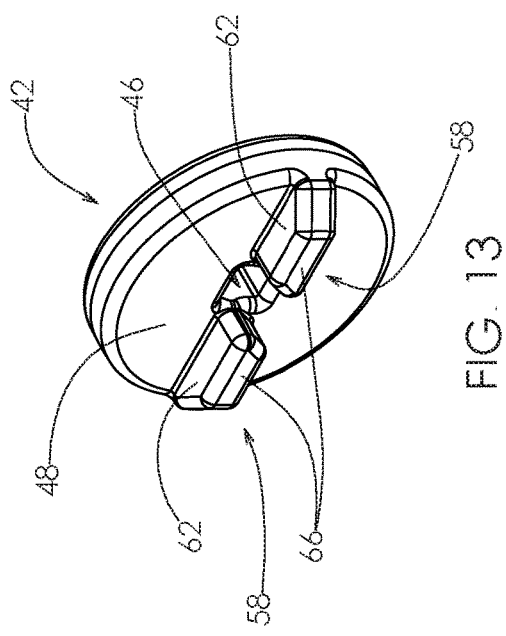
FIG. 13 is a perspective view of an exemplary T-bolt locking device.
Figure 15:
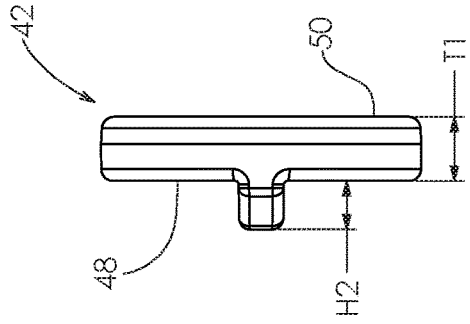
FIG. 15 is a side elevational view of the locking device shown in FIGS. 13 and 14.

The structure comprises a track interface surface 48 that is configured to engage the upper surface 16 of the opposing walls 14 of the track 10 and an accessory interface surface 50 that is configured to engage a lower or bottom surface of the accessory 67 (shown but not referenced in FIGS. 20-23), which would ordinarily directly engage the upper surface 16 of the opposing walls 14 in the absence of the structure interposed therebetween. The track interface surface 48 and the accessory interface surface 50 are both illustrated as substantially planar surfaces but may also be other shapes configured to appropriately align the T-bolt locking device 42 with a track and with an accessory, respectively. It should be appreciated that the track interface surface 48 and the accessory interface surface 50 of the structure may be provided with a frictional feature (indicated generally at 52 in FIG. 16) that may cooperate with a mounting interface surface 68 of an accessory 67. As shown in FIG. 16, an exemplary frictional feature 52 is shown on the accessory interface surface 50 of the structure. The exemplary frictional feature 52 is comprised of radially extending raised and lowered surfaces 54 (e.g., teeth), emanating from a point proximate the through hole 46 toward an outer perimeter 56 of the structure. Such features could deform under stress upon tightening the accessory 67, increasing frictional contact between the accessory interface surface 50 of the structure and the lower surface of the accessory 67, thus reducing the risk that the accessory 67 would become inadvertently loosened in relation to the structure, and thus, the track 10. Cooperating features on both the accessory interface surface 50 of the structure and the mounting interface surface 68 of an accessory 67 could provide interlocking contacts therebetween, further reducing the risk that the accessory 67 would become inadvertently loosened in relation to the structure. Moreover, the use of cooperation features may permit incremental adjustment of the accessory 67 in relation to the structure, even at discrete positions.

A T-bolt locking device 42 may further comprise one or more nodules, projections, or protuberances, such as the tabs 58 (e.g., a relatively small flap or strip of material extending from the structure), extending in an axial direction (i.e., to the left when viewing FIG. 15) and along a line in a radial direction (i.e., horizontally, or left and right when viewing FIG. 14), emanating, for example, from a point proximate the through hole 46 toward the perimeter 56 of the structure. The tabs 58 have a width W3 (shown in FIG. 14) that is dimensioned to fit or pass through the slot 12 and a height H2 (shown in FIG. 15) that is dimensioned to extend through the slot 12 and into the interior 20 of the track 10. The height H2 of the tabs 58 may be limited so as to not extend beyond the interior 20 of the track 10, for example, so as to not engage or bottom out against a bottom wall of the track 10.

Figure 14:
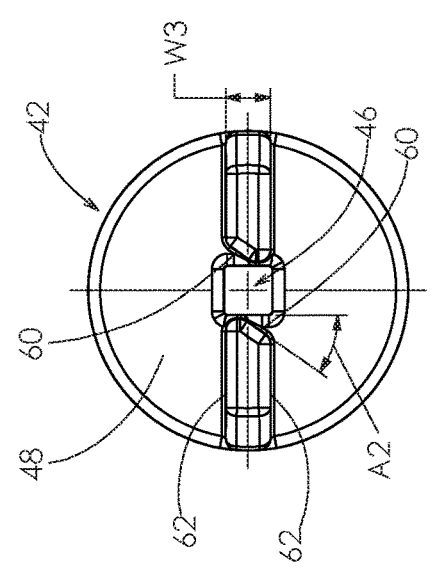
FIG. 14 is a bottom plan view of the locking device shown in FIG. 13.

As shown in FIG. 14, each tab 58 may have a T-bolt alignment surface 60 facing in a direction proximate the through hole 46. In the preferred embodiment illustrated, there are two tabs 58, each with a T-bolt alignment surface 60. The T-bolt alignment surfaces 60 in this embodiment are approximately parallel with one another and cooperate to form an opening that is greater than the width W1 of the head 24 of the T-bolt 22. These T-bolt alignment surfaces 60 may be angled and function as stop surfaces, which are configured to engage the parallel sides 32 of the flanges 28 or head 24 of the T-bolt 22 (as shown in FIGS. 17-19) to prevent rotation of the T-bolt 22 in both clockwise and counter-clockwise directions, but at least in the direction in which the head 24 is urged to rotate due to friction between the threaded shaft 26 and the threaded portion of the accessory 67, when the accessory 67 is loosened. It is conceivable that the angle of the T-bolt alignment surface 60 could be any suitable angle, including a right angle relative to the side walls 62 of the tabs 58. However, the exemplary T-bolt alignment surfaces 60 are angled at some angle so that when rotation of the head 24 of the T-bolt 22 is limited to an angle less than 90 degrees relative to the side walls 18 of the track 10, as described above, the T-bolt alignment surfaces 60 are approximately aligned with the rotated angle of the head 24 of the T-bolt 22, and may thereby capture and retain the T-bolt 22. In a preferred embodiment of the invention, the angle A2 of the T-bolt alignment surface 60 is 35 degrees in relation to a line perpendicular to the side walls 62 of the tabs 58.

Figure 23:
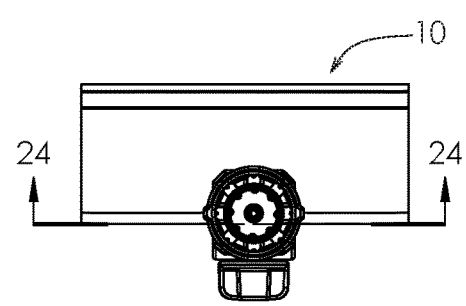
FIG. 23 is a top plan view of the T-bolt, accessory and track shown in FIGS. 20-22.
Figure 21:
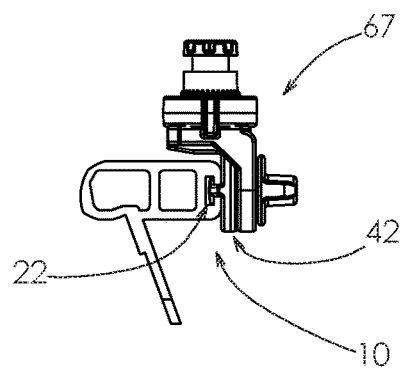
FIG. 21 is an end view of the locking device, T-bolt, accessory and track shown in FIG. 20.
Figure 22:
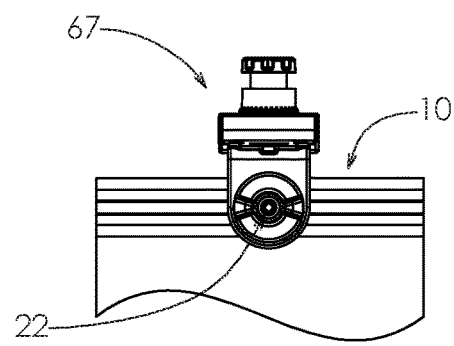
FIG. 22 is a side elevational view of the locking device, T-bolt, accessory and track shown in FIGS. 20 and 21.
Figure 31:
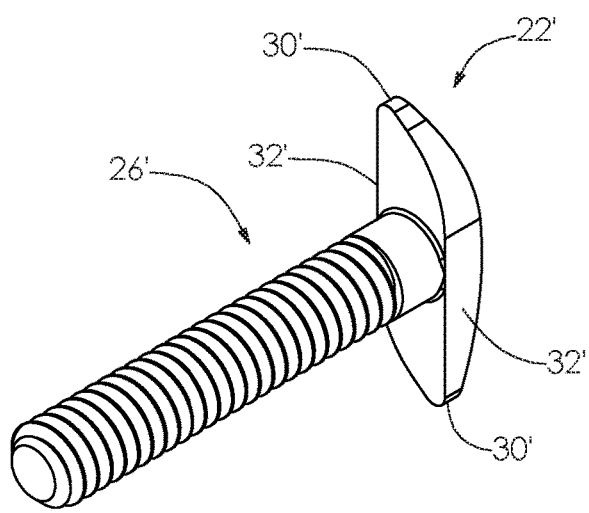
FIG. 31 is a perspective view of the T-bolt shown in FIGS. 28-30.
Figure 28:
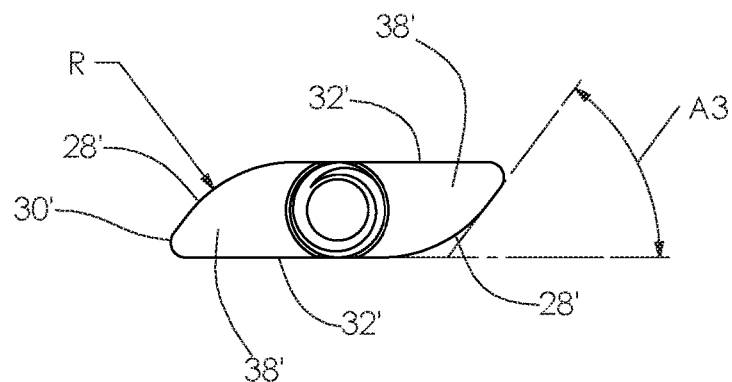
FIG. 28 is a top plan view of an alternative T-bolt for use with the accessory mounting track.

In FIGS. 20-24, there is illustrated a T-bolt locking device 42 in cooperation with a track 10 and an accessory 67. In FIGS. 21-23, the head 24 of the T-bolt 22 is retained in the interior 20 of the track 10, and the threaded shaft 26 is passed through the through hole 46 of the locking device 42. The tabs 58 of the locking device 42 are inserted into the slot 12 of the track 10, preventing rotation of the locking device 42 with respect to the track 10. In accordance with this view, the track interface surface 48 of the locking device 42 is in abutment to the upper surface 16 of the track 10. The accessory interface surface 50 of the locking device 42 is engageable with a mounting interface surface 68 of an accessory 67. In FIG. 21, the track interface surface 48 of the structure of the device 42 is shown clearly engaging the upper surface 16 of the opposing walls 14 of the track 10. In this view, the tabs 58 pass through the slot 12 into the interior 20 of the track 10. The head 24 of the T-bolt 22 is received between the T-bolt alignment surfaces 60 of the tabs 58. In a preferred embodiment, the head 24 is supported in the interior 20 of the track 10 at an angle relative to the side walls 18 of the track 10, wherein that angle is less than 90 degrees. In the illustrated embodiment, the angle A2 (shown in FIG. 14) of the T-bolt alignment surfaces 60 of the tabs 58 is chosen so that the parallel sides 32 of the flanges 28 or head 24 may be fully captured by the T-bolt alignment surfaces 60 of the tabs 58 while the terminal ends 30 of the flanges 28 are approximately aligned with the inner surfaces 36 of the side walls 18 of the track 10. Of course, a mutual engagement of ends 30, walls 18 and T-bolt alignment surfaces 60 would be dependent upon the dimensions and configurations of the track 10, the T-bolt 22 and the T-bolt locking device 42. In any event, it should be appreciated that the tabs 58, regardless of the angle A2 of the T-bolt alignment surfaces 60 and the angular disposition of the terminal ends 30, may be configured to prevent rotation of the head 24 and hold the head 24, and thus the opposing flanges 28, beneath the opposing walls 14, to prevent the T-bolt 22 from being removed from the slot 12 of the track 10. That is to say, the opposing flanges 28 of the T-bolt 22 are trapped beneath the opposing walls 14 of the track 10, as shown in FIG. 21. In this trapped position, the T-bolt 22 cannot inadvertently fall or otherwise come out of the slot 12, and thus, cannot inadvertently become separated from the track 10, eliminating or reducing the risk of an accessory 67 threaded on the shaft 26 of the T-bolt 22 being lost.

When fastening the T-bolt 22 and locking device 42, if the locking device 42 does not seat against the upper surface 16 of the opposing walls 14 of the track 10, this indicates that the T-bolt 22 is under-rotated and not properly engaged with the track 10 because the opposing tabs 58 of the locking device 42 are contacting the upper surface 38 of the opposing flanges 28 of the head 24 of the T-bolt 22. This prevents the T-bolt 22 from being received between the T-bolt alignment surfaces 60 of the tabs 58 of the locking device 42, and thus, prevents the accessory 67 from being tightened against the track 10.

As illustrated in FIGS. 25-27, it should be appreciated that rotation of the T-bolt 22 need not have a length L1 that is longer than the width of the width W2 of the interior 20 of the track 10, and the locking device 42 will still function to prevent the T-bolt 22 from rotating. That is to say, a T-bolt 22 having a length L1 that is less that the width W2 of the interior 20 of the track 10 will still be prevented from rotation by the locking device 42 by virtue that the terminal ends 30 will function as stop surfaces configured to engage the parallel sides 32 of the flanges 28 or head 24 of the T-bolt 22. In the absence of the locking device 42, such a T-bolt would be permitted to rotate continuously within the interior 20 of the track 10. However, with the locking device 42, it is clear that the T-bolt 22 cannot align with the slot 12 of the track 10 in the removal position so long as the head 24 of the T-bolt 22 is constrained by the tabs 58. Any tab geometry that begins within a distance, for example, that is one-half the length L1 of the head 24 from the center of the hole 46 allowing the shaft 26 of the T-bolt 22 therethrough should retain the T-bolt 22. As the distance between the T-bolt alignment surfaces 60 approach the width W1 of the head 24 of the T bolt 22, the less freedom the flanges 28 of the head 24 of the T-bolt 22 have to rotate within the confines created by tabs 58 between the T-bolt alignment surfaces 60.

It should be appreciated that the T-bolt locking device 42 may be a separate component, or integral with the T-bolt 22 or the accessory 67. It should be noted that orientational terms used throughout this description are with reference to the orientation of the track, T-bolt and T-bolt locking device as presented in the accompanying drawings, which is subject to change depending on the orientation of the various parts and components. Therefore, orientational terms are used for semantic purposes, and do not limit the invention or its component parts in any particular way.

Figure 30:
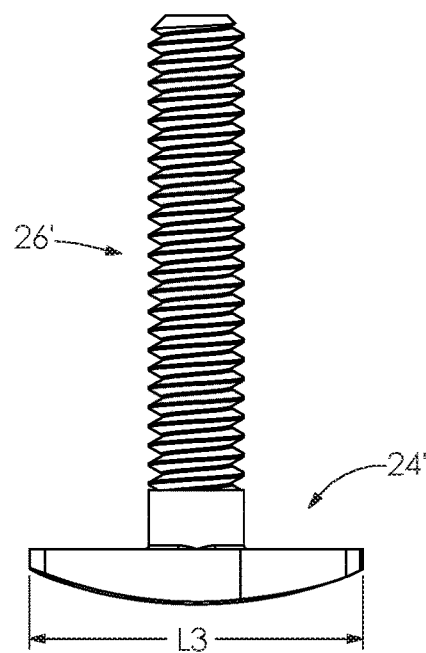
FIG. 30 is a side elevational view of the T-bolt shown in FIGS. 28 and 29.
Figure 29:
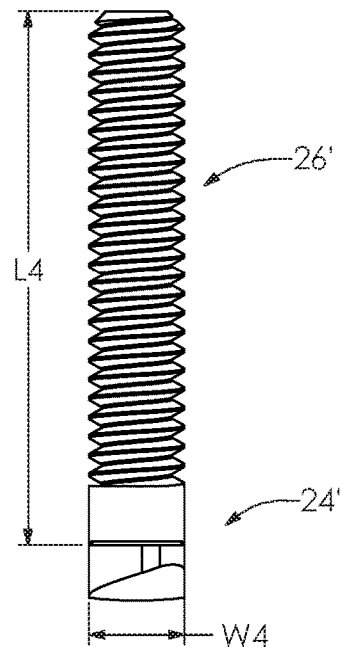
FIG. 29 is an end view of the T-bolt shown in FIG. 28.

In FIGS. 28-31, there is illustrated an alternative T-bolt 22. The T-bolt 22 comprises a head 24 and a threaded shaft 26 (e.g., a ¼-20 threaded shaft) extending from the head 24. The head 24 comprises flanges 28 extending in opposing direction in relation to opposing sides of the shaft 26. In the illustrated embodiment, the head 24 is supported concentrically in relation to the shaft 26. Terminal ends 30 of each flange 28 may be generally angularly disposed at an angle A3 (shown in FIG. 28). In the exemplary T-bolt 22, the bottom of the head 24 is curved, as shown in FIG. 30, like that of a carriage bolt, though the bottom may be flat or of other shapes. The head 24 is elongated in shape, having a length L3 (shown in FIG. 30) in a longitudinal direction and a width W4 (shown in FIG. 29) in a lateral direction.

Figure 33:
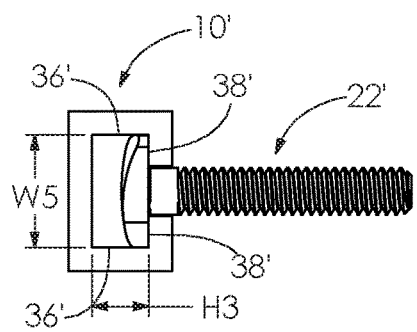
FIG. 33 is a side elevational view the T-bolt and track shown in FIG. 32.
Figure 32:
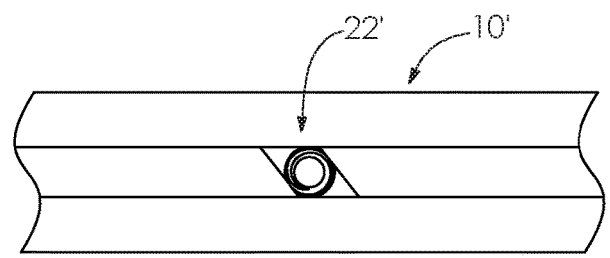
FIG. 32 is a reduced scale side elevational view the alternative T-bolt rotated in a section of a narrow track.
Figure 35:
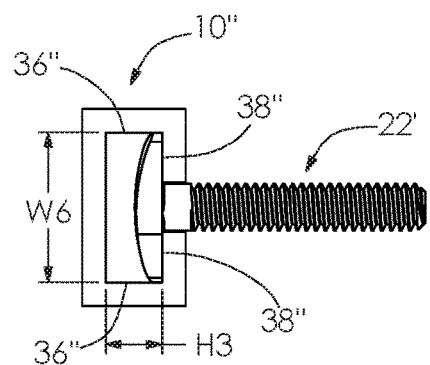
FIG. 35 is a side elevational view the T-bolt and track shown in FIG. 34.
Figure 34:
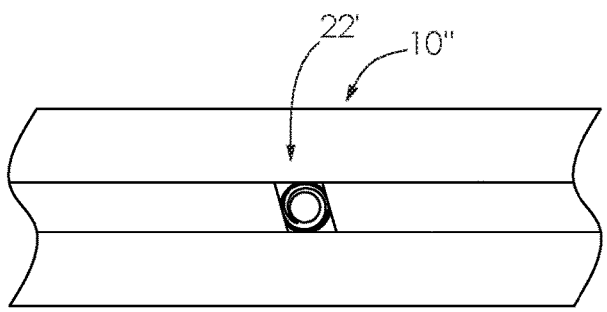
FIG. 34 is a reduced scale side elevational view the alternative T-bolt rotated in a section of a wide track.
Figure 42:
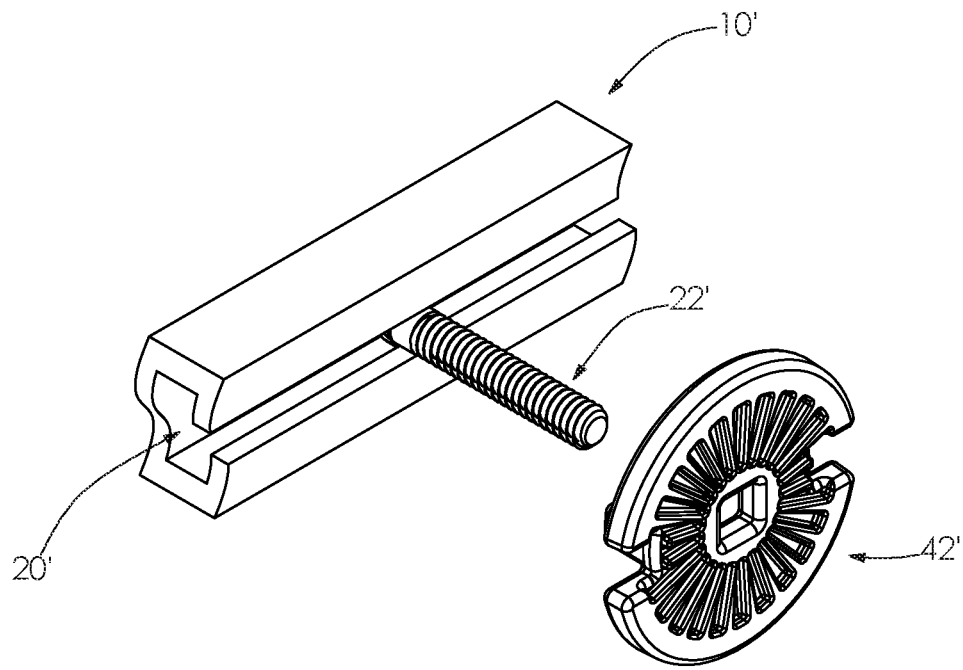
FIG. 42 is an exploded perspective view of the alternative locking device and T-bolt and a section of track.
Figure 43:
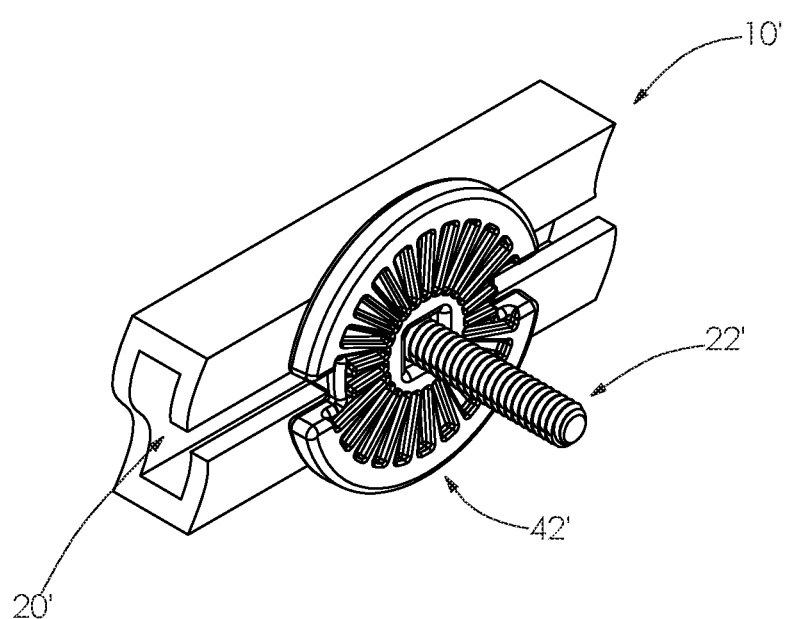
FIG. 43 is a perspective view of the locking device and T-bolt and a section of track should in FIG. 42.
Figure 44:
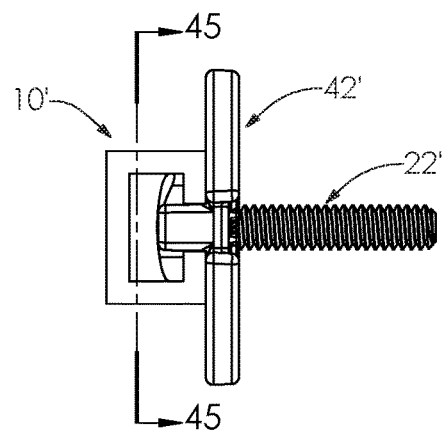
FIG. 44 is an end view of the locking device and T-bolt and a section of track shown in FIG. 43.
Figure 45:
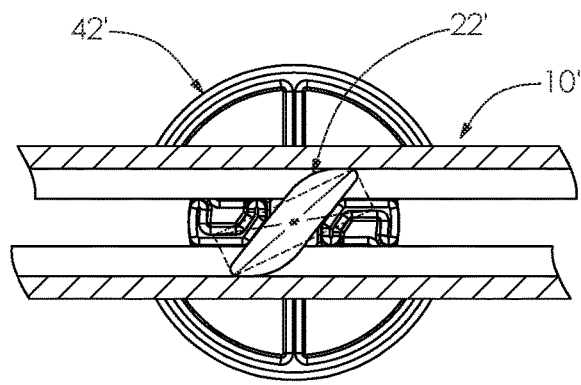
FIG. 45 is a cross-sectional view of the T-bolt and track taken along the line 45-45 in FIG. 44.
Figure 46:
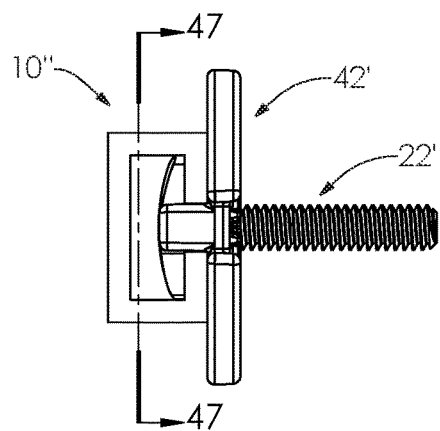
FIG. 46 is an end view of the locking device and T-bolt and an alternative section of track.
Figure 47:
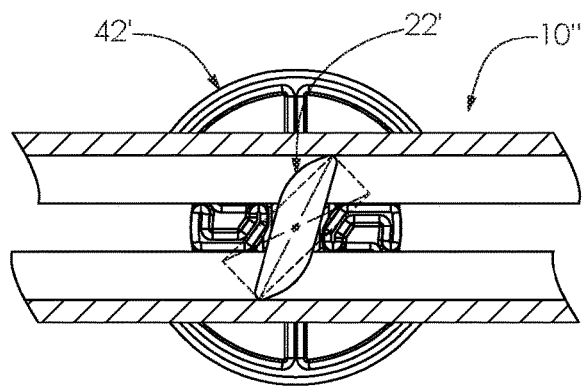
FIG. 47 is a cross-sectional view of the T-bolt and track taken along the line 47-47 in FIG. 46.

The width W4 of the head 24 is sized to fit through a slot 12 in a track when the head 24 is inserted into the slot 12 anywhere along the slot 12 in a substantially lengthwise direction that coincides with a lengthwise direction of the track 10 (i.e., in a generally horizontal direction when viewing FIGS. 32 and 34). The height H1 (shown in FIGS. 33 and 35) of the interior 20 of the track 10 is sufficiently dimensioned so that upon inserting the head 24 through the slot 12 and into the interior 20 of the track 10, the head 24 may be rotated beneath the opposing walls 14, for example, by rotating the shaft 26 (in a clockwise direction when viewing FIGS. 32 and 34), until the terminal ends 30 of the flanges 28 engage opposing inner surfaces 36 of the opposing side walls 18 of the track 10 (as shown in FIGS. 45 and 47). This prevents further rotation of the T-bolt 22. To be clear, the length L1 of the head 24 is preferably longer that the width W2 (shown in FIGS. 33 and 35) of the interior 20 of the track 10, so that rotation of the head 24 is limited. According to a preferred embodiment of the T-bolt 22, the angular disposition of the terminal ends 30 of the flanges 28 and the cooperation with the angularly disposed terminal ends 30 of the flanges 28 with the inner surfaces 36 of the side walls 18 may restrict the rotation of the head 24 to a predetermined angle. In any event, the head 24 is rotatable to a stop position (shown in FIGS. 45 and 47). In the stop position, the head 24 is trapped in the interior 20 of the track 10, whereby removal of the head 24 is restricted by the engagement of an upper surface 38 of the flanges 28 with a lower or bottom surface 40 of the opposing walls 14 of the track 10.

Rotation of the head 24, for example, in a clockwise direction when viewing FIGS. 32 and 34, can be accomplished by threading a female threaded portion of an accessory 67 (shown in FIGS. 48-50), which may be a thumbscrew, knob, nut, or some other threaded portion, onto the threaded shaft 26 of the T-bolt 22. The accessory 67 may be unitary in construction or may comprise two or more separate components, such as the accessory 67 shown in FIGS. 48-50, some of which may not be threaded. The threaded portion of the accessory 67 can be threaded onto the T-bolt 22, and rotated until the cooperation between the threaded shaft 26 and the accessory 67 urges the upper surface 38 of each of the opposing flanges 28 to engage the bottom surface 40 of a respective one of the opposing walls 14 and the accessory 67 tightly engages the upper surface 16 of the opposing walls 14 to fix the accessory 67 in relation to the track 10. To adjust the position of the accessory 67 in relation to the track 10, the accessory 67 may be loosened from the threaded shaft 26 of the T-bolt 22 and slid linearly or lengthwise (i.e., generally horizontally when viewing FIGS. 10 and 11) and then retightened when in a desired position. However, it should be appreciated that upon loosening the accessory 67, the head 24 of the T-bolt 22 may rotate, for example, in a counter-clockwise direction when viewing FIGS. 32 and 34, in alignment with the slot 12, at which point the head 24 may pass through the slot 12. As indicated above, because the accessory 67 may obstruct view of the head 24 of the T-bolt 22 and the slot 12, the head 24 of the T-bolt 22 could align with the slot 12 so as to inadvertently fall or otherwise come out of the slot 12, which could result in the loss of the accessory 67. Loss of the accessory 67 could particularly occur if the track 10 is supported in relation to a moving vehicle or vessel, such as a maritime vessel, for example, a kayak, moving in a body of water.

To prevent or mitigate the risk of loss of the accessory 67, an alternative T-bolt locking device 42 is shown in FIGS. 36-41. The alternative T-bolt locking device 42 comprises a generally disc-shaped structure (e.g., a structure with a shape or surface that is generally round and generally flat in appearance). As stated above, the shape is not to be limited to a disc (e.g., a round structure) but may take on any suitable shape. Moreover, in this context the term flat may be understood to mean substantial planar, although other shapes may be conceivable and within the scope of the invention. The structure may have a thickness T1 (shown in FIG. 38), for example, that is relatively thin, at least in comparison to that of the length L2 (shown in FIG. 29) of the shaft 26 of the T-bolt 22 so as to leave exposed sufficient threads of the shaft 26 for readily threading into the accessory 67. Notwithstanding, the structure should be sufficiently robust (i.e., sufficiently dimensioned and configured) to provide a structural integrity ample for supporting features and engagement with the track 10 and an accessory 67, as will become apparent in the description that follows. It should be appreciated that the structure may be formed of a plastic or polymer material, or a metal material, or a combination of such materials, or such materials in combination with other materials, which would provide the desired structural integrity, within confines or limitations established, for example, by the dimensions and configuration of the track 10, the T-bolt 22 and the cooperating accessory 67.

The structure comprises a through hole 46 dimensioned and configured to permit the passage of the threaded shaft 26 of the T-bolt 22 therethrough (shown in FIGS. 36-41). Although a generally square-shaped through hole 46 is shown, the through hole 46 may be of any suitable shape dimensioned to permit the passage of the threaded shaft 26.

The structure comprises a track interface surface 48 that is configured to engage the upper surface 16 of the opposing walls 14 of the track 10 and an accessory interface surface 50 that is configured to engage a lower or bottom surface of the accessory 67 (shown but not referenced in FIGS. 48-50), which would ordinarily directly engage the upper surface 16 of the opposing walls 14 in the absence of the structure interposed therebetween. The track interface surface 48 and the accessory interface surface 50 are both illustrated as substantially planar surfaces but may also be other shapes configured to appropriately align the T-bolt locking device 42 with a track and with an accessory, respectively. It should be appreciated that the track interface surface 48 and the accessory interface surface 50 of the structure may be provided with a frictional feature (indicated generally at 52 in FIGS. 40 and 41) that may cooperate with a mounting interface surface 68 of an accessory 67. As shown in FIG. 40, an exemplary frictional feature 52 is shown on the accessory interface surface 50 of the structure. The exemplary frictional feature 52 is comprised of radially extending raised and lowered surfaces 54 (e.g., teeth), emanating from a point proximate the through hole 46 toward an outer perimeter 56 of the structure. Such features could deform under stress upon tightening the accessory 67, increasing frictional contact between the accessory interface surface 50 of the structure and the lower surface of the accessory 67, thus reducing the risk that the accessory 67 would become inadvertently loosened in relation to the structure, and thus, the track 10. Cooperating features on both the accessory interface surface 50 of the structure and the mounting interface surface 68 of an accessory 67 could provide interlocking contacts therebetween, further reducing the risk that the accessory 67 would become inadvertently loosened in relation to the structure. Moreover, the use of cooperating features may permit incremental adjustment of the accessory 67 in relation to the structure, even at discrete positions.

A T-bolt locking device 42 may further comprise one or more nodules, projections, or protuberances, such as the tabs 58 (e.g., a relatively small flap or strip of material extending from the structure), extending in an axial direction (i.e., to the left when viewing FIG. 36) and along a line in a radial direction (i.e., horizontally, or left and right when viewing FIG. 37), emanating, for example, from a point proximate the through hole 46 toward the perimeter 56 of the structure.

The tabs 58 have a width W3 (shown in FIG. 37) that is dimensioned to fit or pass through the slot 12 and a height H2 (shown in FIG. 38) that is dimensioned to extend through the slot 12 and into the interior 20 of the track 10. The height H2 of the tabs 58 may be limited so as to not extend beyond the interior 20 of the track 10, for example, so as to not engage or bottom out against a bottom wall of the track 10.

As shown in FIG. 37, each tab 58 may have a T-bolt alignment surface 60 facing in a direction proximate the through hole 46. In the preferred embodiment illustrated, there are two tabs 58, each with a T-bolt alignment surface 60. The T-bolt alignment surfaces 60 in this embodiment are approximately parallel with one another and cooperate to form an opening that is greater than the width W1 of the head 24 of the T-bolt 22. These T-bolt alignment surfaces 60 may be angled and function as stop surfaces, which are configured to engage the parallel sides 32 of the flanges 28 or head 24 of the T-bolt 22 (as shown in FIGS. 45 and 47) to prevent rotation of the T-bolt 22 in both clockwise and counter-clockwise directions, but at least in the direction in which the head 24 is urged to rotate due to friction between the threaded shaft 26 and the threaded portion of the accessory 67, when the accessory 67 is loosened. It is conceivable that the angle of the T-bolt alignment surface 60 could be any suitable angle, including a right angle relative to the side walls 62 of the tabs 58. However, the exemplary T-bolt alignment surfaces 60 are angled at some angle so that when rotation of the head 24 of the T-bolt 22 is limited to an angle less than 90 degrees relative to the side walls 18 of the track 10, as described above, the T-bolt alignment surfaces 60 are approximately aligned with the rotated angle of the head 24 of the T-bolt 22, and may thereby capture and retain the T-bolt 22. In a preferred embodiment of the invention, the angle A2 of the T-bolt alignment surface 60 is 35 degrees in relation to a line perpendicular to the side walls 62 of the tabs 58.

Figure 50:
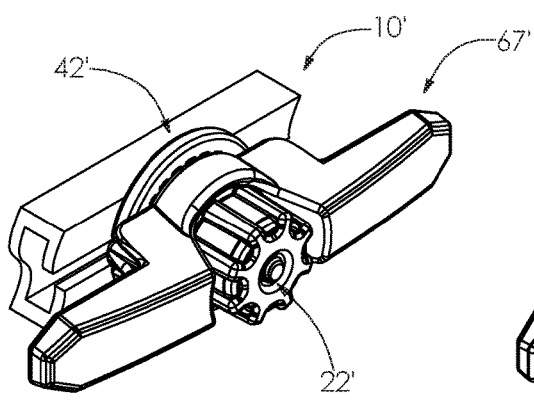
FIG. 50 is a top view of the locking device, T-bolt, accessory and track shown in FIG. 49.
Figure 49:
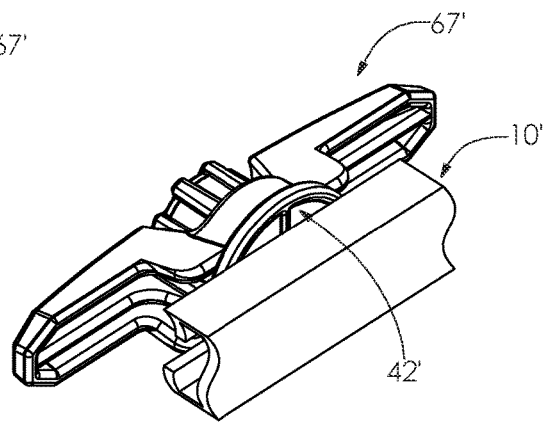
FIG. 49 is a bottom view of the locking device, T-bolt, accessory and track shown in FIG. 48.
Figure 48:
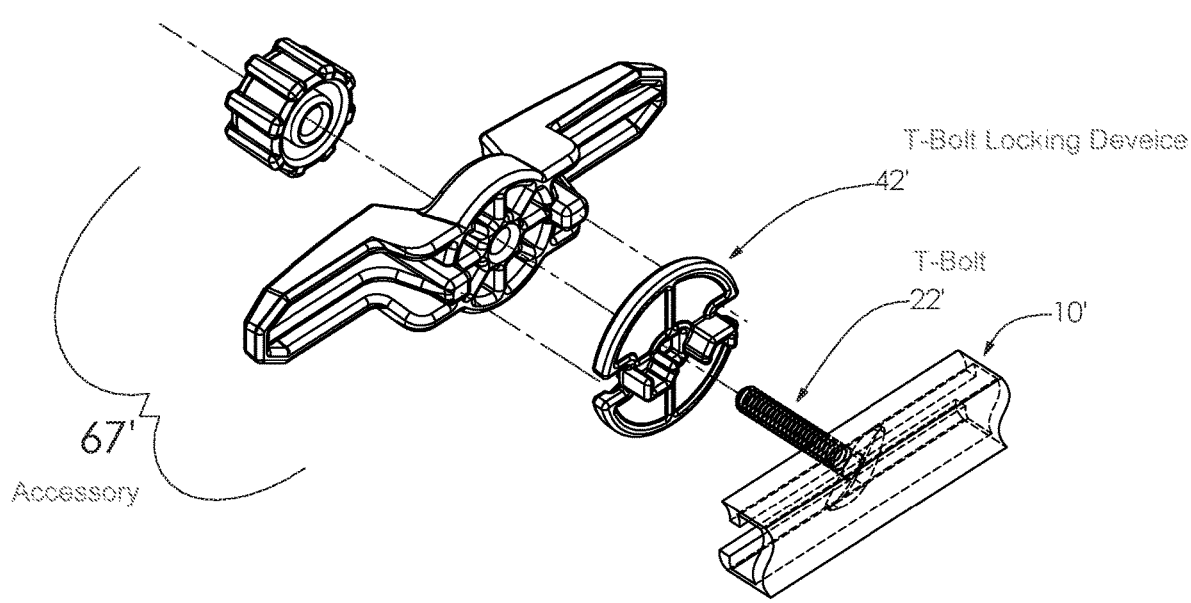
FIG. 48 is a reduced scale, exploded bottom perspective view of the alternative locking device and T-bolt configured to mount an exemplary accessory and a section of track.

In FIGS. 48-50, there is illustrated a T-bolt locking device 42 in cooperation with a track 10 and an accessory 67. In FIGS. 49-50, the head 24 of the T-bolt 22 is retained in the interior 20 of the track 10, and the threaded shaft 26 is passed through the through hole 46 of the locking device 42. The tabs 58 of the locking device 42 are inserted into the slot 12 of the track 10, preventing rotation of the locking device 42 with respect to the track 10. In accordance with these views, the track interface surface 48 of the locking device 42 is in abutment to the upper surface 16 of the track 10. The accessory interface surface 50 of the locking device 42 is engageable with a mounting interface surface 68 of an accessory 67. The track interface surface 48 of the structure of the device 42 is shown clearly engaging the upper surface 16 of the opposing walls 14 of the track 10. The tabs 58 pass through the slot 12 into the interior 20 of the track 10. The head 24 of the T-bolt 22 is received between the T-bolt alignment surfaces 60 of the tabs 58. In a preferred embodiment, the head 24 is supported in the interior 20 of the track 10 at an angle relative to the side walls 18 of the track 10, wherein that angle is less than 90 degrees. In the illustrated embodiment, the angle A2 (shown in FIG. 37) of the T-bolt alignment surfaces 60 of the tabs 58 is chosen so that the parallel sides 32 of the flanges 28 or head 24 may be fully captured by the T-bolt alignment surfaces 60 of the tabs 58 while the terminal ends 30 of the flanges 28 are approximately aligned with the inner surfaces 36 of the side walls 18 of the track 10. Of course, a mutual engagement of ends 30, walls 18 and T-bolt alignment surfaces 60 would be dependent upon the dimensions and configurations of the track 10, the T-bolt 22 and the T-bolt locking device 42. In any event, it should be appreciated that the tabs 58, regardless of the angle A2 of the T-bolt alignment surfaces 60 and the angular disposition of the terminal ends 30, may be configured to prevent rotation of the head 24 and hold the head 24, and thus the opposing flanges 28, beneath the opposing walls 14, to prevent the T-bolt 22 from being removed from the slot 12 of the track 10. That is to say, the opposing flanges 28 of the T-bolt 22 are trapped beneath the opposing walls 14 of the track 10, as shown in FIGS. 32 and 34 and FIGS. 45 and 47. In this trapped position, the T-bolt 22 cannot inadvertently fall or otherwise come out of the slot 12, and thus, cannot inadvertently become separated from the track 10, eliminating or reducing the risk of an accessory 67 threaded on the shaft 26 of the T-bolt 22 being lost.

When fastening the T-bolt 22 and locking device 42, if the locking device 42 does not seat against the upper surface 16 of the opposing walls 14 of the track 10, this indicates that the T-bolt 22 is under-rotated and not properly engaged with the track 10 because the opposing tabs 58 of the locking device 42 are contacting the upper surface 38 of the opposing flanges 28 of the head 24 of the T-bolt 22. This prevents the T-bolt 22 from being received between the T-bolt alignment surfaces 60 of the tabs 58 of the locking device 42, and thus, prevents the accessory 67 from being tightened against the track 10.

It should be appreciated that the T-bolt 22 need not have a length L1 that is longer than the width W2 of the interior 20 of the track 10, and the locking device 42 will still function to prevent the T-bolt 22 from rotating. In the absence of the locking device 42, such a T-bolt would be permitted to rotate continuously within the interior 20 of the track 10. However, with the locking device 42, it is clear that the T-bolt 22 cannot align with the slot 12 of the track 10 in the removal position so long as the head 24 of the T-bolt 22 is constrained by the tabs 58. Any tab geometry that begins within a distance, for example, that is one-half the length L1 of the head 24 from the center of the hole 46 allowing the shaft 26 of the T-bolt 22 therethrough should retain the T-bolt 22. As the distance between the T-bolt alignment surfaces 60 approach the width W1 of the head 24 of the T bolt 22, the less freedom the flanges 28 of the head 24 of the T-bolt 22 have to rotate within the confines created by tabs 58 between the T-bolt alignment surfaces 60.

The T-bolt 22 is intended to rotate in a direction of rotation associated with tightening the accessory 67 (in clockwise direction when viewing FIGS. 32 and 34 and a counter-clockwise when viewing FIGS. 45 and 47). A relatively large radii R is added to each of the terminal ends 30 of the flanges 28 to allow the terminal ends 30 to engage with the opposing side walls 14 of the slot 12 of the accessory mounting track 10, allowing the angle of the head 24 of the T-bolt 22 to be closer to vertical) (90° with respect to the slot 12 of the accessory mounting track 10 when in a horizontal orientation. This places a larger portion of the surface area of the head 24 of the T-bolt 22 within the slot 12 of the accessory mounting track 10, yielding a stronger interface between the accessory mounting track 10 and the upper surface 16 of the accessory mounting track 10 when the accessory 67 is tightened in relation to the accessory mounting track 10. This increased rotation results in a more robust or sturdier configuration to prevent rotation of the T-bolt 22 in a counter-clockwise direction (when viewing FIGS. 32 and 34) on the T-bolt locking device 42. The increased rotation or engagement with the slot 12 of the accessory mounting track 10 requires that upon loosening the accessory 67 (e.g., a threaded knob), the head 24 of the T bolt 22 must rotate a sufficient amount to disengage with the accessory mounting track 10 and release the accessory 67 from the accessory mounting track 10. The sufficient amount of rotation is dictated by the radially extending raised and lowered surfaces (e.g., locking teeth), which may vary between 45 degrees and 90 degrees, with 90 degrees being the ideal engagement between the accessory mounting track 10 and the head 24 of the T bolt 22. It should be appreciated that the angle of the head 24 of the T-bolt 22 relative to the slot 12 of the accessory mounting track 10 is defined by the width W2 of the interior of the accessory mounting track 10. The narrower the width W2, the shallower the angle of the head 24 of the T-bolt 22. Slots of accessory mounting tracks are typically configured to accept the head of a ¼-20 threaded carriage bolt, which is 0.594" in diameter, making the minimum width of the interior of the accessory mounting track 10 approximately 0.6 inch.

It should be clearly understood that the head of a conventional T-bolt would provide inferior rotational engagement and fastener cross-sectional engagement with the slot 12.

The T-bolt locking device 42 shown in FIGS. 13-16 is formed from a solid slug of plastic. The provided-bolt locking device 42' shown in FIGS. 36-41 is more economical and uses less plastic. However, the function as it relates to locking the T-bolt in the accessory mounting track is the same.

Moreover, the T-bolt locking device 42' in FIGS. 36-41 incorporates two opposingly disposed openings 70. The openings 70 cooperate with accessories, such as the accessory 67' shown FIGS. 48-50, that have teeth, such as the teeth 72 shown in the FIGS. 48-50, to align the accessories in the slot of an accessory mounting track. With the T-bolt locking device 42' in place, the teeth 72 on the accessory 67' engage with the T-bolt locking device 42' to key the accessory 67' to the T-bolt locking device 42', and in turn, key the accessory 67' in relation to the slot of the accessory mounting track. Therefore, the accessory 67' is still transitively keyed to the slot of the accessory mounting track. It should be appreciated that, the openings 70 may be patterned radially about the T-bolt locking device 42' to provide a plurality of engagement positions for the accessory 67'. The openings 70 may be configured to mate with correspond with teeth of conventional accessories.

It should be appreciated that the T-bolt locking device 42 may be a separate component, or integral with the T-bolt 22 or the accessory 67. It should be noted that orientational terms used throughout this description are with reference to the orientation of the track, T-bolt and T-bolt locking device as presented in the accompanying drawings, which is subject to change depending on the orientation of the various parts and components. Therefore, orientational terms are used for semantic purposes, and do not limit the invention or its component parts in any particular way.

It should be appreciated that the T-bolt locking device 42 may be a separate component, or integral with the T-bolt 22 or the accessory 67. It should be noted that orientational terms used throughout this description are with reference to the orientation of the track, T-bolt and T-bolt locking device as presented in the accompanying drawings, which is subject to change depending on the orientation of the various parts and components. Therefore, orientational terms are used for semantic purposes, and do not limit the invention or its component parts in any particular way.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

PARTS LIST 10, 10', 10" accessory mounting track
12, 12' slot
14, 14' opposing upper walls
16, 16' an upper surface (of opposing upper walls)
18, 18' opposing side walls
20, 20' interior
22, 22' T-bolt
24, 24' head
26, 26' threaded shaft
28, 28' opposingly directed flanges
30, 30' terminal ends (of flanges)
32, 32' parallel sides (of flanges or head)
L1, L3 length (of head)
W1, W4 width (of head)
H1, H3 height (of the interior of the track)
W2, W5, W6 width (of the interior of the track)
36, 36' inner surfaces (of the side walls)
38, 38' an upper surface (of the flanges)
40, 40' a lower or bottom surface (of the opposing upper walls)
A1, A3 angle (of terminals ends relative to the parallel sides of the head)
42, 42' T-bolt locking device
T1, T2 thickness (of structure)
L2, L4 length (of the shaft of the T-bolt)
46, 46' through hole (of structure)
48, 48' track interface surface (of structure)
50, 50' accessory interface surface (of structure)
52, 52' frictional feature (of structure)
54, 54' radially extending raised and lowered surfaces (e.g., teeth)
56, 56' an outer perimeter (of the structure)
58, 58' nodules, projections, protuberances, such as the tabs
W3, W7 width (of tabs)
H2, H4 height (of tabs)
60, 60' T-bolt alignment surface (of tabs)
62, 62' side walls (of the tabs)
64, 64' side walls (of flanges)
A2, A4 angle (of inner terminal surfaces of tabs)
66, 66' lower surfaces (of opposing tabs of the locking device)
67, 67' accessory
68, 68' mounting interface surface (of accessory)
70 tooth openings
72 accessory teeth

What is claimed is:

1. A T-bolt in combination with a T-bolt locking device for providing positive engagement of the T-bolt with an accessory mounting track to prevent rotation of the T-bolt to prevent inadvertent separation of the T-bolt from the accessory mounting track, wherein the accessory mounting track comprises a slot at least partially bounded between opposing upper walls and an interior at least partially bounded between the opposing upper walls and opposing side walls, the combination comprising:

the T-bolt comprising a head fixedly attached to a threaded shaft, and the T-bolt locking device comprising a disk-shaped structure having opposingly directed generally planar surfaces bounded by an outer circumferential wall and a through hole passing through the disk-shape structure for receiving the threaded shaft of the T-bolt through the through hole through the disk-shaped structure and tabs on opposing sides of the through hole, the tabs co-aligning with each other and extending generally perpendicularly from one of the generally planar surfaces of the disk-shaped structure, the tabs being dimensioned and configured to pass through the slot of the accessory mounting track and to enter into the interior of the accessory mounting track and being spaced to receive the head of the T-bolt between the tabs to obstruct rotation of the head of the T-bolt within the interior of the accessory mounting track to prevent inadvertent separation of the T-bolt from the accessory mounting track.

2. The combination of claim 1, wherein the disk-shaped structure is formed of a material selected from a group of materials comprising plastic, polymer, metal, or a combination thereof.

3. The combination of claim 1, wherein the through hole is a generally square-shaped through hole.

4. The combination of claim 1, wherein the generally planar surface from which the tabs extend is a track interface surface that is configured to engage an upper surface of the opposing upper walls of a track and the other one of the opposing generally planar surfaces is an accessory interface surface that is configured to engage a lower surface of an accessory.

5. The combination of claim 4, wherein the accessory interface surface is provided with a frictional feature that cooperates with the lower surface of the accessory.

6. The combination of claim 5, wherein the frictional feature is comprised of radially extending raised and lowered surfaces defining teeth emanating from a point proximate the through hole toward the outer circumferential wall of the disk-shaped structure.

7. The combination of claim 6, wherein the teeth provide interlocking contacts between the accessory interface surface of the disk-shaped structure and a mounting interface surface of the accessory.

8. The combination of claim 6, wherein the tabs have a T-bolt alignment surface facing in a direction proximate the through hole, the T-bolt alignment surfaces being approximately parallel with one another and cooperate to form an opening that is greater than a width of the head of the T-bolt.

9. The combination of claim 8, wherein the T-bolt alignment surfaces are angled and function as stop surfaces, which are configured to engage parallel sides of the head of the T-bolt to obstruct rotation of the T-bolt in both clockwise and counter-clockwise directions.

10. The combination of claim 9, wherein the T-bolt alignment surfaces are angled at some angle so that rotation of the head of the T-bolt is limited to an angle less than 90 degrees relative to the side walls of the track, and the T-bolt alignment surfaces are approximately aligned with the rotated angle of the head of the T-bolt to thereby capture and retain the T-bolt.

11. The combination of claim 1, wherein the T-bolt locking device is integral with the T-bolt.

* * * * *